(12) United States Patent
Takano et al.

(10) Patent No.: US 9,545,912 B2
(45) Date of Patent: Jan. 17, 2017

(54) HYBRID VEHICLE MODE-SWITCHING CONTROL DEVICE

(71) Applicant: Nissan Motor Co., Ltd., Yokohama-shi, Kanagawa (JP)

(72) Inventors: Akira Takano, Atsugi (JP); Shintaro Oshio, Sagamihara (JP); Yoshihisa Kodama, Sagamihara (JP); Takuro Hirano, Gotemba (JP)

(73) Assignee: Nissan Motor Co., Ltd., Yokohama (JP)

( * ) Notice: Subject to any disclaimer, the term of this patent is extended or adjusted under 35 U.S.C. 154(b) by 89 days.

(21) Appl. No.: 14/433,882

(22) PCT Filed: Oct. 30, 2013

(86) PCT No.: PCT/JP2013/079421
§ 371 (c)(1),
(2) Date: Apr. 7, 2015

(87) PCT Pub. No.: WO2014/069528
PCT Pub. Date: May 8, 2014

(65) Prior Publication Data
US 2015/0283993 A1  Oct. 8, 2015

(30) Foreign Application Priority Data

Nov. 1, 2012 (JP) .................. 2012-241456

(51) Int. Cl.
*B60W 20/10* (2016.01)
*B60K 6/48* (2007.10)
(Continued)

(52) U.S. Cl.
CPC .............. *B60W 20/10* (2013.01); *B60K 6/48* (2013.01); *B60K 6/543* (2013.01); *B60K 6/547* (2013.01); *B60L 7/14* (2013.01); *B60L 11/14* (2013.01); *B60L 15/2009* (2013.01); *B60W 10/02* (2013.01); *B60W 10/06* (2013.01);
(Continued)

(58) Field of Classification Search
CPC .......... B60W 20/10; B60W 10/02; B60K 6/48
See application file for complete search history.

(56) References Cited

U.S. PATENT DOCUMENTS

2012/0059544 A1* 3/2012 Kinoshita .......... B60G 17/0164
701/22

FOREIGN PATENT DOCUMENTS

JP 2000-199442 A 7/2000
JP 2001-208177 A 8/2001
(Continued)

*Primary Examiner* — Basil T Jos
(74) *Attorney, Agent, or Firm* — Global IP Counselors, LLP

(57) ABSTRACT

A hybrid vehicle mode-switching control device for a hybrid vehicle controls that an output of an engine and/or motor in response to a mode-switch request. In a case of a difference between an actual transmission gear ratio and a target transmission gear ratio, a deficit with respect to the requested drive power occurs that causes discomfort to the driver. The drive power surplus or deficit caused by the transmission gear ratio deviation can eliminated by correcting of the motor torque and/or the engine torque by a correction amount necessary to eliminate the surplus or deficit of drive power. In this way, the lack of drive power due to the transmission ratio deviation and the driver's sense of discomfort can be eliminated.

10 Claims, 4 Drawing Sheets

(51) Int. Cl.
  *B60W 10/02* (2006.01)
  *B60W 20/00* (2016.01)
  *B60K 6/543* (2007.10)
  *B60L 11/14* (2006.01)
  *B60W 10/08* (2006.01)
  *B60L 7/14* (2006.01)
  *B60L 15/20* (2006.01)
  *B60W 10/107* (2012.01)
  *B60K 6/547* (2007.10)
  *B60W 10/06* (2006.01)
  *B60W 10/30* (2006.01)
  *B60W 10/10* (2012.01)

(52) U.S. Cl.
  CPC ............ *B60W 10/08* (2013.01); *B60W 10/10* (2013.01); *B60W 10/107* (2013.01); *B60W 10/30* (2013.01); *B60W 20/00* (2013.01); *B60W 20/19* (2016.01); *B60W 20/30* (2013.01); *B60W 20/40* (2013.01); *B60K 2006/4808* (2013.01); *B60L 2210/40* (2013.01); *B60L 2240/12* (2013.01); *B60L 2240/36* (2013.01); *B60L 2240/421* (2013.01); *B60L 2240/423* (2013.01); *B60L 2240/425* (2013.01); *B60L 2240/441* (2013.01); *B60L 2240/443* (2013.01); *B60L 2240/545* (2013.01); *B60L 2250/26* (2013.01); *B60W 2510/0666* (2013.01); *B60W 2510/085* (2013.01); *B60W 2510/1005* (2013.01); *B60W 2710/0677* (2013.01); *B60W 2710/086* (2013.01); *B60W 2710/1005* (2013.01); *Y02T 10/626* (2013.01); *Y02T 10/6221* (2013.01); *Y02T 10/645* (2013.01); *Y02T 10/70* (2013.01); *Y02T 10/7077* (2013.01); *Y02T 10/7241* (2013.01); *Y02T 10/7275* (2013.01); *Y10S 903/93* (2013.01)

(56) References Cited

FOREIGN PATENT DOCUMENTS

| | | |
|---|---|---|
| JP | 2003-294124 A | 10/2003 |
| JP | 2005-233252 A | 9/2005 |
| JP | 2006-234043 A | 9/2006 |

* cited by examiner

| | L/B | H/C | R/B |
|---|---|---|---|
| FIRST GEAR | O | × | × |
| SECOND GEAR | × | O | × |
| REVERSE | × | × | O |
| NEUTRAL | × | × | × |

HYBRID VEHICLE MODE-SWITCHING CONTROL DEVICE

CROSS-REFERENCE TO RELATED APPLICATIONS

This application is a U.S. National stage application of International Application No. PCT/JP2013/079421, filed Oct. 30, 2013, which claims priority to Japanese Patent Application No. 2012-241456 filed in Japan on Nov. 1, 2012.

BACKGROUND

Field of the Invention

The present invention relates to a mode-switching control device for a hybrid vehicle, the vehicle having an engine and an electric motor as on-board power sources, and being switchable between an electric operation mode (EV mode) in which the vehicle is operated with the electric motor only, and a hybrid operation mode (HEV mode) in which the vehicle is operated with the electric motor and the engine.

Background Information

Hybrid vehicles of this type known in the prior art include that disclosed, e.g., in Japanese Laid-Open Patent Application No. 2000-199442. This hybrid vehicle has a design in which an engine provided as one of the power sources is decouplably drive-coupled to vehicle wheels via a continuously variable transmission and a clutch in that order, whereas an electric motor provided as the other power source is coupled full-time to the wheels.

With this hybrid vehicle, electric operation (EV operation) in EV mode powered by the electric motor alone is possible by stopping the engine and releasing the clutch, while hybrid operation (HEV operation) in HEV mode powered by the electric motor and the engine is possible by starting the engine and engaging the clutch.

By releasing the clutch in the aforedescribed manner during EV operation, the stopped engine (and, when a transmission is present, the transmission as well) is decoupled from the vehicle wheels, and the engine (transmission) is not co-rotated (dragged) during EV operation, avoiding energy losses to a commensurate extent, so that the energy efficiency can be increased.

SUMMARY

With the aforedescribed hybrid vehicle, in the event of a change in the running state, such as depressing of the accelerator pedal during EV operation with the engine stopped and the clutch disengaged, the engine is restarted and the clutch is engaged, switching the mode from the EV operation mode to the HEV operation mode.

However, Patent Document 1 does not mention drive power control at times of EV→HEV mode switching, or shift control of the transmission, giving rise to the following problem. That is, normally, shift control of a transmission employs working oil from an engine-driven oil pump as the medium, but once the engine has stopped and the system has switched over to the EV operation mode, working oil is no longer discharged from the oil pump. This, combined with the fact that the transmission is not rotating, leads to a state of disabled shift control.

Nor is it the case that the transmission will, during EV operation, be maintained at the same transmission gear ratio as that prevailing at the time of switchover to the EV operation mode (when the engine is stopped), and due to leakage of working oil within the shift control system, or to actuation, albeit slight, of the shift control mechanism by preloading produced by a spring or the like within the shift control mechanism, the transmission gear ratio during EV operation may gradually deviate from the transmission gear ratio prevailing at the time of switchover to the EV operation mode (when the engine is stopped), leading in either event to an inability to ascertain the actual transmission gear ratio during EV operation.

During EV→HEV mode-switching, the engine is started up, but until the time that the engine rotation, through complete explosion, reaches a startup-completed value, and the amount of oil discharged from the oil pump reaches an amount at which shift control becomes possible, there is a corresponding response lag following initiation of EV→HEV mode switching, and the transmission remains in a state of disabled shift control during this interval as well.

For these reasons, a significant discrepancy arises between the actual transmission gear ratio at the time that, upon completion of startup when the engine attains complete explosion, a sufficient amount of working oil is discharged from the oil pump and the transmission has become capable of shift control, and a target transmission gear ratio corresponding to the running state, resulting in a surplus or deficit of vehicle wheel drive power with respect to the target transmission gear ratio corresponding to the running state, the surplus or deficit being equivalent to the transmission gear ratio deviation between the actual transmission gear ratio and the target transmission gear ratio.

In conventional hybrid vehicles, of which that disclosed in Japanese Laid-Open Patent Application No. 2000-199442 is representative, no attempt is made to eliminate drive power surpluses or deficits caused by the aforementioned transmission gear ratio deviation during EV→HEV mode switching, which may cause the driver to experience discomfort associated with an inability to obtain a drive power level that is commensurate to the driver's control input.

An object of the present invention is to provide an improved mode-switching control device for a hybrid vehicle, with which drive power surpluses or deficits caused by the aforementioned transmission gear ratio deviation during EV→HEV mode switching can be reduced, and the aforedescribed problems avoided.

In order to achieve the above objective, the mode-switching control device for a hybrid vehicle of the present invention is constituted as follows.

Turning first to a description of the hybrid vehicle on which the present invention is premised, the vehicle is a vehicle which is equipped with an electric motor in addition to an engine as power sources, the engine is drive-coupled to vehicle wheels via a transmission, and the transmission and the vehicle wheels can be decoupled by a clutch; it being possible, by releasing the clutch and stopping the engine, to select an electric operation mode in which operation is powered by the electric motor only, or, by starting the engine and engaging the clutch, to select a hybrid operation mode in which operation is powered by the electric motor and the engine.

The mode-switching control device of the present invention is characterized by the feature that, when the mode is switched from the electric operation mode to the hybrid operation mode, the output of the electric motor and/or the engine is controlled to a value dependent on the vehicle running state, and in the event that the actual transmission gear ratio of the transmission differs from a target transmission gear ratio corresponding to the vehicle running state, the output of the electric motor and/or the engine is corrected to reduce the surplus or deficit of drive power caused by transmission gear ratio deviation between the actual transmission gear ratio and the target transmission gear ratio.

In the mode-switching control device for a hybrid vehicle according to the present invention, when mode-switching from the electric operation mode to the hybrid operation mode, the output of the electric motor and/or the engine is controlled to a value dependent on the vehicle running state, and in the event that the actual transmission gear ratio of the transmission differs from a target transmission gear ratio corresponding to the vehicle running state, the output of the electric motor and/or the engine is corrected so as to reduce any drive power surplus or deficit due to transmission gear ratio deviation between the two. Therefore, surplus or deficit of drive power caused by transmission gear ratio deviations during the aforementioned mode-switching is eliminated, a change in drive power level that is commensurate to the driver's control input can be produced, and discomfort associated with generation of a drive power level different from the driver's control input can be eliminated.

BRIEF DESCRIPTION OF THE DRAWINGS

Referring now to the attached drawings which form a part of this original disclosure.

DETAILED DESCRIPTION OF THE EMBODIMENTS

The embodiment of the present invention is described below on the basis of the accompanying drawings.

Embodiment 1

Figure 1:
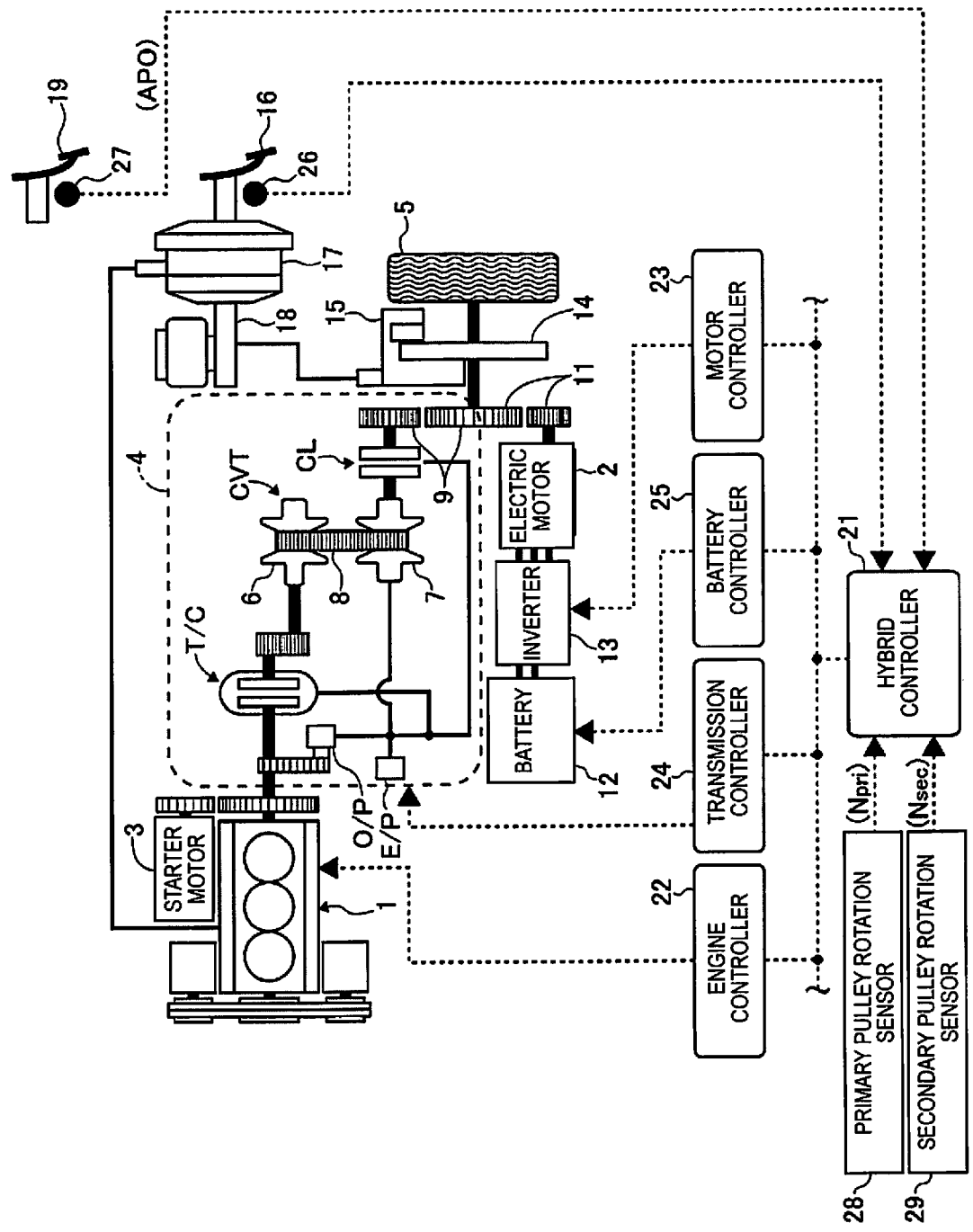
FIG. 1 is a schematic system diagram showing the drive system of a hybrid vehicle equipped with the mode-switching control device according to an embodiment of the present invention.

FIG. 1 is a schematic system diagram showing the drive system of a hybrid vehicle equipped with the mode-switching control device according to an embodiment of the present invention, and the overall control system thereof.

The hybrid vehicle of FIG. 1 is provided with an engine 1 and an electric motor 2 as on-board power sources, the engine 1 being started by a starter motor 3. The engine 1 is appropriately decouplably drive-coupled to drive wheels 5 via a V-belt continuously variable transmission 4; the scheme of the V-belt continuously variable transmission 4 is as described below.

The V-belt continuously variable transmission 4 has as the primary constituent element a continuously variable transmission mechanism CVT comprising a primary pulley 6, a secondary pulley 7, and a V-belt 8 suspended between the pulleys 6, 7. The primary pulley 6 is linked to a crankshaft of the engine 1 via a lockup torque converter T/C, and the secondary pulley 7 is linked to the drive wheels 5 by a transmission clutch CL (corresponding to the clutch in the present invention) and a final gear set 9, in that order.

With the transmission clutch CL in the engaged state, power from the engine 1 is input to the primary pulley 6 through the torque converter TIC, and thereafter reaches the drive wheels 5 through the V-belt 8, the secondary pulley 7, the transmission clutch CL, and the final gear set 9, in that order, and is employed for operation of the hybrid vehicle.

During transmission of engine power, by increasing the pulley V groove width of the secondary pulley 7 while decreasing the pulley V groove width of the primary pulley 6, the wound arc diameter of the V-belt 8 about the primary pulley 6 increases, while at the same time the wound arc diameter about the secondary pulley 7 decreases, and the V-belt continuously variable transmission 4 can carry out upshifting to a pulley ratio on the high side (high-side transmission gear ratio). Conversely, by decreasing the pulley V groove width of the secondary pulley 7 while increasing the pulley V groove width of the primary pulley 6, the wound arc diameter of the V-belt 8 about the primary pulley 6 decreases, while at the same time the wound arc diameter about the secondary pulley 7 increases, and the V-belt continuously variable transmission 4 can carry out downshifting to a pulley ratio on the low side (low-side transmission gear ratio).

The electric motor 2 is drive-coupled full-time to the drive wheels 5 via final gear set 11, the electric motor 2 being driven by electrical power from a battery 12 via an inverter 13. The inverter 13 converts DC electrical power from the battery 12 to AC electrical power supplied to the electric motor 2, and by increasing or decreasing the supplied electrical power to the electric motor 2, controls the drive power and controls the rotation direction of the electric motor 2.

The electric motor 2, in addition to motor driving in the aforedescribed manner, functions also as a generator, and is employed for regenerative braking, discussed below. At times of regenerative braking, the inverter 13 places a generation load equivalent to the regenerative braking force on the electric motor 2, thereby prompting the electric motor 2 to act as a generator, the generated power of the electric motor 2 being stored to the battery 12.

In the hybrid vehicle equipped with the drive system described above in FIG. 1, when the electric motor 2 is driven in a state in which the transmission clutch CL is disengaged and the engine 1 is stopped, only the power of the electric motor 2 reaches the drive wheels 5 through the final gear set 11, and the hybrid vehicle can be operated in electric operation mode (EV mode) by the electric motor 2 alone. During this time, due to the transmission clutch CL being disengaged, the engine 1 in the stopped state is not co-rotated, and unnecessary power consumption during EV operation can be minimized.

When, in the aforedescribed EV operation state, the engine 1 is started up by the starter motor 3 and the transmission clutch CL is engaged, power from the engine 1 reaches the drive wheels 5 through the torque converter T/C, the primary pulley 6, V-belt 8, the secondary pulley 7, the transmission clutch CL, and the final gear set 9, in that order, and the hybrid vehicle can operate in hybrid operation mode (HEV mode), powered by the engine 1 and the electric motor 2.

To bring the hybrid vehicle to a stop from the operating state described above, or to maintain this stopped state, this object is achieved by squeezing of brake disks 14, which rotate in tandem with the drive wheels 5, by calipers 15 to brake the wheels. The calipers 15 are connected to a master cylinder 18 which is actuated in response to depressing of a brake pedal 16 depressed by the driver, and which outputs brake fluid pressure corresponding to the brake pedal depression force, at boost force provided by a negative pressure brake booster 17, the calipers 15 being actuated by the brake fluid pressure and carrying out braking of the brake disks 14.

In either the EV mode or the HEV mode, the hybrid vehicle drives the drive wheels 5 at a level of torque in response to a drive power command input through depressing of an accelerator pedal 19 by the driver, and is operated at drive power in accordance with that requested by the driver.

The functions of selecting the operating mode of the hybrid vehicle, output control of the engine 1, rotation direction control and output control of the electric motor 2, shift control of the continuously variable transmission 4 and engagement/disengagement control of the transmission clutch CL, and charge/discharge control of the battery 12 are respectively controlled by the hybrid controller 21, via a corresponding engine controller 22, motor controller 23, transmission controller 24, and battery controller 25.

For this reason, the hybrid controller 21 inputs a signal from a normally-open brake switch 26 that switches from OFF to ON during braking by depressing of the brake pedal 16, a signal from an accelerator opening amount sensor 27 that detects the amount of accelerator pedal depression (accelerator opening amount) APO, a signal from a primary pulley rotation sensor 28 that detects the rotation speed Npri of the primary pulley 6, and a signal from a secondary pulley rotation sensor 29 that detects the rotation speed Nsec of the secondary pulley 7. The hybrid controller 21 additionally exchanges internal information with the engine controller 22, the motor controller 23, transmission controller 24, and battery controller 25.

The engine controller 22, in response to a command from the hybrid controller 21, performs output control of the engine 1; and the motor controller 23, in response to a command from the hybrid controller 21, performs rotation direction control and output control of the electric motor 2 via the inverter 13.

The transmission controller 24, in response to a command from the hybrid controller 21, uses oil from an engine-driven oil pump O/P as the medium, or when a working medium is needed while running of the engine 1 is stopped, uses oil from an electric pump E/P as the working medium, to carry out shift control of the continuously variable transmission 4 (V-belt continuously variable transmission mechanism CVT), as well lockup control of a torque converter T/C, and engagement/disengagement control of the transmission clutch CL. The battery controller 25, in response to a command from the hybrid controller 21, performs charge/discharge control of the battery 12.

Figures 2A, 2B:
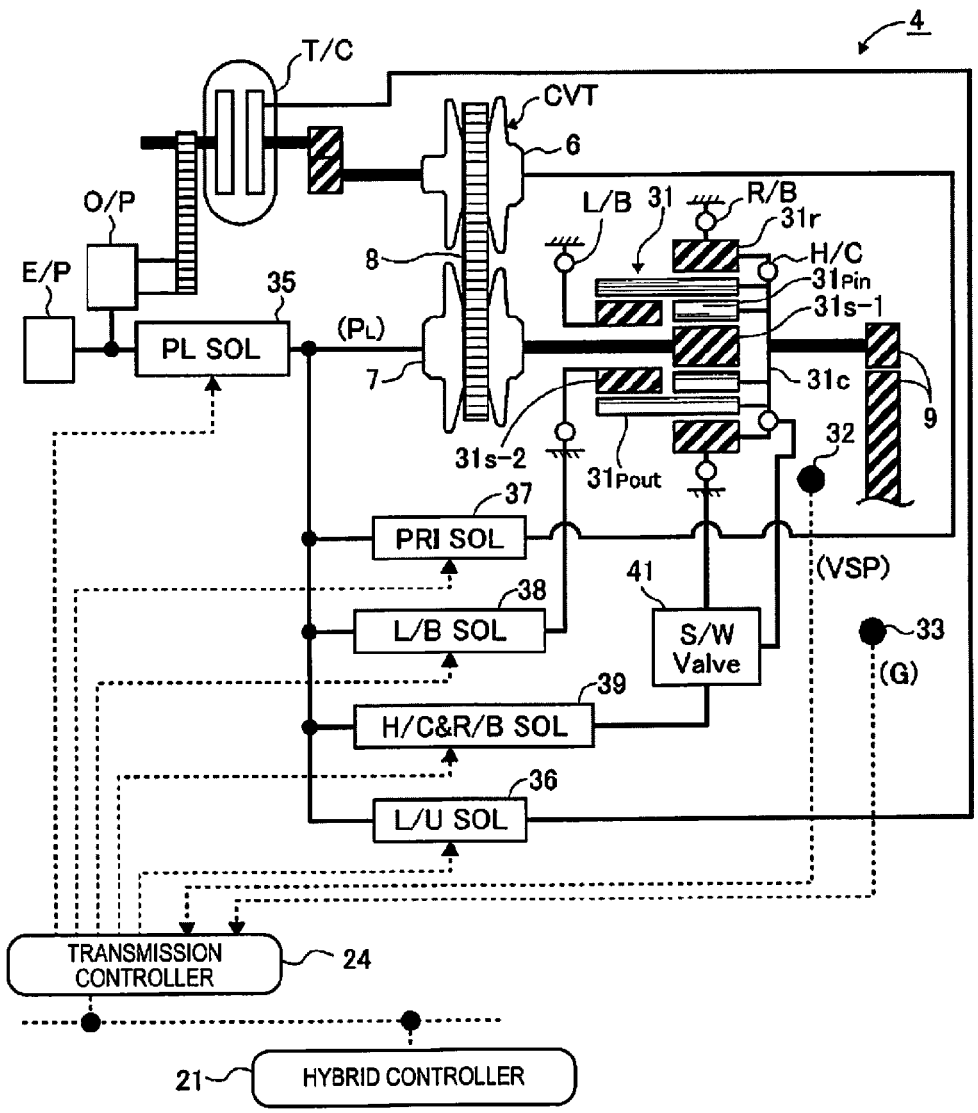
FIG. 2A is a schematic system of a hybrid vehicle of another design in which it is possible for the mode-switching control device of the present invention to be applied.
FIG. 2B is an engagement logic diagram of gearshift friction elements in an auxiliary transmission incorporated within a V-belt continuously variable transmission in the drive system of the hybrid vehicle.

In FIG. 1, the transmission clutch CL has been provided for exclusive use by the continuously variable transmission 4, in order to decouplably link the V-belt continuously variable transmission mechanism CVT (the secondary pulley 7) and the drive wheels 5; however, when, as shown in exemplary fashion in FIG. 2A, the continuously variable transmission 4 incorporates an auxiliary transmission 31 between the V-belt continuously variable transmission mechanism CVT (the secondary pulley 7) and the drive wheels 5, friction elements (a clutch, brake, or the like) responsible for shifting of the auxiliary transmission 31 may be put to additional use to decouplably link the V-belt continuously variable transmission mechanism CVT (the secondary pulley 7) and the drive wheels 5. In this case, it would not be necessary to additionally provide the dedicated clutch CL for the purpose of decouplably linking the V-belt continuously variable transmission mechanism CVT (the secondary pulley 7) and the drive wheels 5, which is advantageous from a cost standpoint.

The auxiliary transmission 31 of FIG. 2A is constituted by a Ravigneaux planetary gear set comprising compound sun gears $31s$-1 and $31s$-2, an inner pinion 31pin, an outer pinion 31pout, a ring gear $31r$, and a carrier $31c$ rotatably supporting the pinions 31pin, 31pout. Of the compound sun gears $31s$-1 and $31s$-2, the sun gear $31s$-1 is linked to the secondary pulley 7 so as to act as an input rotation member, while the sun gear $31s$-2 is arranged coaxially with respect to the secondary pulley 7, and is able to rotate freely.

The inner pinion 31pin meshes with the sun gear $31s$-1, and the inner pinion 31pin and the sun gear $31s$-2 respectively mesh with the outer pinion 31pout. The outer pinion 31pout meshes with the inner circumference of the ring gear $31r$, linking the carrier $31c$ to the final gear set 9 in such a way as to act as an output rotation member.

The carrier $31c$ and the ring gear $31r$ are designed to be linkable in appropriate fashion through a high clutch H/C, the ring gear $31r$ is designed to be capable of being fixed in appropriate fashion by a reverse brake R/B, and the sun gear $31s$-2 is designed to be capable of being fixed in appropriate fashion by a low brake L/B.

The auxiliary transmission 31 engages the shift friction elements, i.e., the high clutch H/C, the reverse brake R/B, and the low brake L/B, in the combinations shown by the "○" symbols in FIG. 2B, and at other times releases the elements as shown by the "x" symbols in FIG. 2B, whereby a gear level of forward first gear, second gear, or reverse can be selected.

When the high clutch H/C, the reverse brake RIB, and the low brake L/B are all released, the auxiliary transmission 31 is placed in neutral, in which power transmission does not take place; and in this state, engaging the low brake L/B causes the auxiliary transmission 31 to select forward first gear (reducing), engaging the high clutch H/C causes the auxiliary transmission 31 to select forward second gear (direct drive), and engaging the reverse brake RIB causes the auxiliary transmission 31 to select reverse (reverse rotation).

By releasing all of the shift friction elements H/C, R/B, and L/B and placing the auxiliary transmission 31 in neutral, the continuously variable transmission 4 of FIG. 2A can decouple the V-belt continuously variable transmission mechanism CVT (the secondary pulley 7) and the drive wheels 5. Consequently, in the continuously variable transmission 4 of FIG. 2A, the shift friction elements H/C, R/B, and L/B of the auxiliary transmission 31 take on the role of the transmission clutch CL in FIG. 1, and the V-belt continuously variable transmission mechanism CVT (the secondary pulley 7) and the drive wheels 5 can be decouplably linked, without the need to additionally provide the transmission clutch CL as in FIG. 1.

In the continuously variable transmission 4 of FIG. 2A control is carried out using oil from the engine-driven oil pump O/P as the working medium, or when a working medium is needed while running of the engine 1 is stopped, using oil from the electric pump E/P as the working medium, with the transmission controller 24 carrying out control in question of the continuously variable transmission 4 in the following manner, via a line pressure solenoid 35, a lockup solenoid 36, a primary pulley pressure solenoid 37, a low brake pressure solenoid 38, a high clutch pressure & reverse brake pressure solenoid 39, and a switch valve 41.

In addition to the signals described with reference to FIG. 1, the transmission controller 24 inputs a signal from a vehicle speed sensor 32 that detects vehicle speed VSP, and a signal from an acceleration sensor 33 that detects vehicle acceleration/deceleration speed G.

The line pressure solenoid 35, when actuated in response to a command from the transmission controller 24, performs pressure adjustment of the oil from the oil pump O/P (or from the electric pump E/P) to a line pressure $P_L$ that corresponds to the vehicle's requested drive power, and constantly supplies this line pressure $P_L$ as secondary pulley pressure to the secondary pulley 7, whereby the secondary pulley 7 squeezes the V-belt 8 at a thrust commensurate with the line pressure $P_L$, so no slippage occurs.

The lockup solenoid 36, when actuated in response to a command from the transmission controller 24, directs the line pressure $P_L$ in proper fashion towards the torque converter T/C to actuate engagement or slip linkage of a lockup clutch (lockup mechanism), not illustrated, whereby the torque converter T/C, when needed, is placed in a lockup state in which the input/output elements are directly linked such that there is no relative rotation (slip) among them, or placed in a slip lockup state in which the input/output elements are slip-linked so as experience relative rotation within a predetermined rotation tolerance.

The primary pulley pressure solenoid 37, when actuated in response to a CVT transmission gear ratio command from the transmission controller 24, performs pressure adjustment of the line pressure $P_L$ to the primary pulley pressure, and supplies this pressure to the primary pulley 6, whereby the V groove width of the primary pulley 6 and the V groove width of the secondary pulley 7 supplied with the line pressure $P_L$ are controlled such that the CVT transmission gear ratio agrees with that of the command from the transmission controller 24, accomplishing the CVT transmission gear ratio command from the transmission controller 24.

When the transmission controller 24 has issued a first gear selection command for the auxiliary transmission 31, the low brake pressure solenoid 38 supplies the line pressure $P_L$ as low brake pressure to the low brake LB to bring about engagement thereof, and accomplish the first gear selection command.

When the transmission controller 24 has issued a second gear selection command or a reverse selection command for the auxiliary transmission 31, the high clutch pressure & reverse brake pressure solenoid 39 supplies the line pressure $P_L$ as high clutch pressure & reverse brake pressure to the switch valve 41. At times of a second gear selection command, the switch valve 41 directs the line pressure $P_L$ from the solenoid 39 as high clutch pressure towards the high clutch H/C to bring about engagement thereof, and accomplish the second gear selection command of the auxiliary transmission 31. At times of a reverse selection command, the switch valve 41 directs the line pressure $P_L$ from the solenoid 39 as reverse brake pressure towards the reverse brake R/B to bring about engagement thereof, and accomplish the reverse selection command of the auxiliary transmission 31.

Mode-Switching Control

Mode-switching control of the aforedescribed hybrid vehicle will be described below, taking the case of a vehicle drive system like that shown in FIG. 1. During HEV operation, when the accelerator pedal 19 is released to switch over to a coasting (inertia) operation, or when the brake pedal 16 is subsequently depressed to brake the vehicle, the kinetic energy of the vehicle is converted to electrical power through regenerative braking by the electric motor 2, and is stored in the battery 12, thus improving the energy efficiency.

If regenerative braking takes place while remaining in HEV operation (HEV regeneration), because the transmission clutch CL is in the engaged state, there will be a decline in regenerative braking energy, by the equivalent of the reverse drive power (engine braking) of the engine 1 and the equivalent of the friction of the continuously variable transmission 4, making for poor energy regeneration efficiency. For this reason, once regenerative braking has been initiated during HEV operation, the transmission clutch CL is released, thereby decoupling the engine 1 and the continuously variable transmission 4 from the drive wheels 5, and bringing about a switchover to EV operation and creating an EV regeneration state, whereby the engine 1 and the continuously variable transmission 4 are no longer co-rotated, affording an equivalent amount of energy regeneration.

On the other hand, when the transmission clutch CL has been released in the aforedescribed manner, in order to stop the engine 1 to avoid unnecessary operation in response to concerns related to fuel consumption, recommencing fuel injection to the engine 1 (fuel recovery) is prohibited so that fuel injection to the engine 1 (fuel cutoff), which was executed during the aforedescribed coasting operation, continues to be prohibited even after the aforedescribed release of the transmission clutch CL. The engine 1 is thereby stopped at the time that the transmission clutch CL is released. Through the above procedure, switching from the HEV mode to the EV mode is completed.

When the running state changes due to depressing of the accelerator pedal 19 or the like during the EV mode, producing a mode-switching request from the EV mode to the HEV mode, the engine 1 is restarted, and the transmission clutch CL is engaged to carry out switching from the EV mode to the HEV mode.

In the event that appropriate drive power control (output control of the engine 1 and/or the electric motor 2) at the time of the EV→HEV mode switch, or appropriate shift control of the continuously variable transmission 4 (continuously variable transmission mechanism CVT) is neglected, the following problem arises. That is, normally, shift control of the continuously variable transmission 4 (the continuously variable transmission mechanism CVT) employs the working oil from the engine 1-driven oil pump O/P as the medium, and following switchover to the EV operation mode, which stops the engine 1, working oil is no longer discharged from the oil pump O/P, and this, combined with the fact that the continuously variable transmission 4 (the continuously variable transmission mechanism CVT) is not rotating, leads to a state of disabled shift control, even if the electric pump E/P is actuated.

Nor is it the case that the continuously variable transmission 4 (the continuously variable transmission mechanism CVT) will during EV operation be maintained at the same transmission gear ratio as that prevailing at the time of switchover to the EV operation mode (when the engine is stopped), and due to leakage of working oil within the shift control system, or to actuation, albeit slight, of the shift control mechanism by a preload produced by a spring (e.g., a plate spring for urging a moveable sheave of the primary pulley 6 and the secondary pulley 7 towards a fixed sheave) or the like within the shift control mechanism, the transmission gear ratio during EV operation may gradually deviate from the transmission gear ratio prevailing at the time of switchover to the EV operation mode (when the engine is stopped), leading in either event to an inability to ascertain the actual transmission gear ratio during EV operation.

During EV→HEV mode-switching, the engine 1 is started up, but until the time that through attainment of complete explosion, the engine rotation speed reach a startup-completed value, and the amount of discharged oil from the oil pump O/P reaches an amount at which shift control becomes possible, there is a considerable response lag (*1) following initiation of EV→HEV mode switching, and the transmission remains in a state of disabled shift control during this interval as well. Even when the electric pump E/P is actuated at this time, until startup of the engine 1 is completed, the engine rotation speed does not stabilize to the extent that it can be employed for shift control, and the continuously variable transmission 4 (the continuously variable transmission mechanism CVT) still remains in a state of disabled shift control.

For these reasons, a significant discrepancy arises between the actual transmission gear ratio at the time that, upon completion of startup when the engine 1 attains complete explosion, a sufficient amount of working oil is discharged from the oil pump O/P and the continuously variable transmission 4 (the continuously variable transmission mechanism CVT) is enabled for shift control, and a target transmission gear ratio corresponding to the running state. A surplus or deficit of vehicle wheel drive power with respect to the target transmission gear ratio corresponding to the running state is generated, the surplus or deficit being equivalent to the transmission gear ratio deviation between the actual transmission gear ratio and the target transmission gear ratio.

In conventional hybrid vehicles, no attempt is made to eliminate drive power surpluses or deficits caused by the aforementioned transmission gear ratio deviation during EV→HEV mode switching, resulting in the problem that the driver may experience discomfort associated with an inability to obtain a drive power level commensurate to the driver's control input.

The present embodiment proposes improved EV→HEV mode switching control such that this problem is eliminated, or at least partly alleviated. The hybrid controller 21 of FIG. 1 executes the control program of FIG. 3, and, via the engine controller 22 and the transmission controller 24, effects the EV→HEV mode switching control as shown in the time chart of FIG. 4.

Figure 4:
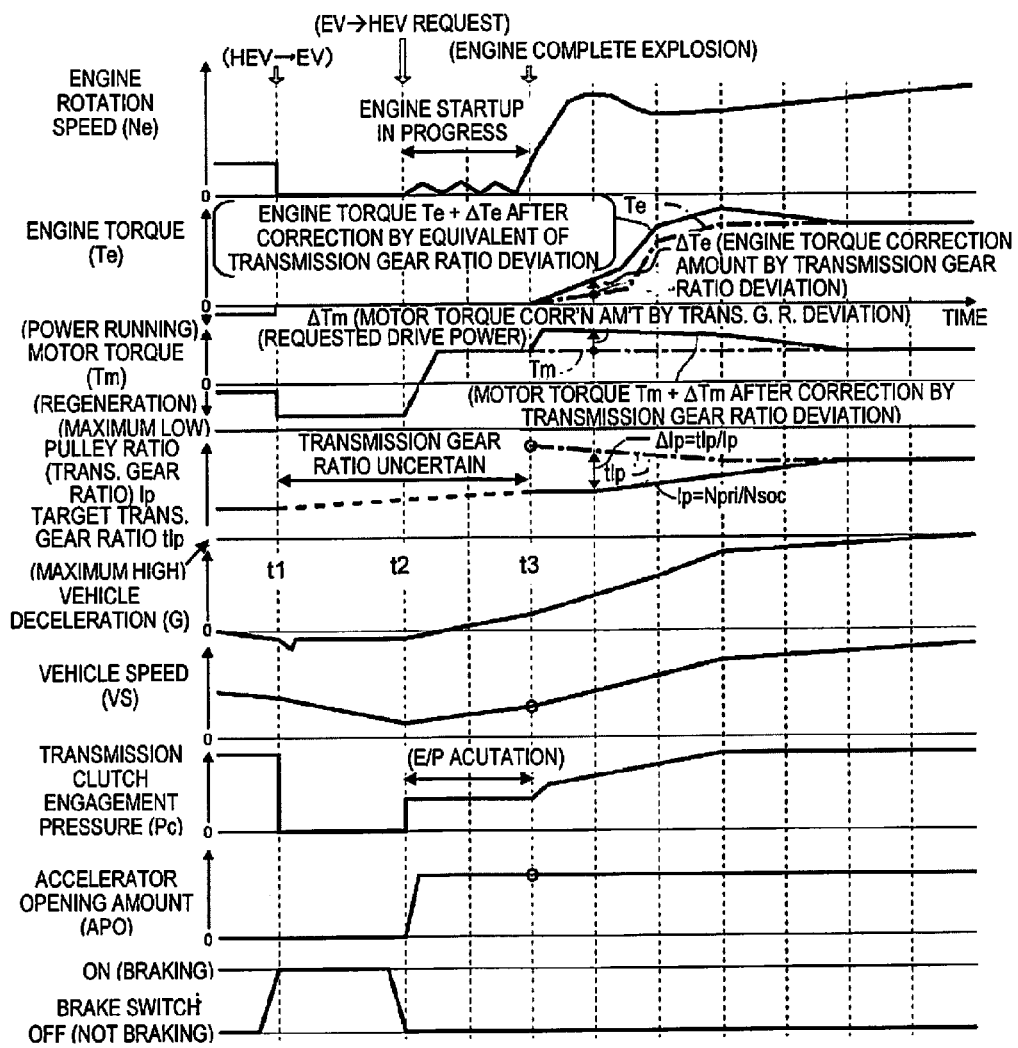
FIG. 4 is a performance time chart of EV→HEV mode-switching by the mode-switching control of FIG. 3.

FIG. 4 is a performance time chart, showing a case in which, during coasting operation, an EV→HEV mode switch request is generated at instant t1 through setting of the accelerator opening amount APO to zero, and through braking control input (brake switch ON), in response to which, the transmission clutch CL is released (clutch pressure Pc=0), and fuel recovery from fuel cutoff, which was being executed during the coasting operation, is prohibited, whereby the engine 1 is stopped (engine rotation speed Ne=0) in association with release of the transmission clutch CL at instant t1; and at a subsequent instant t2, in response to discontinuation of braking control input (brake switch OFF) and depressing of the accelerator pedal (accelerator opening amount APO>0), an EV→HEV mode switch request is generated.

Figure 3:
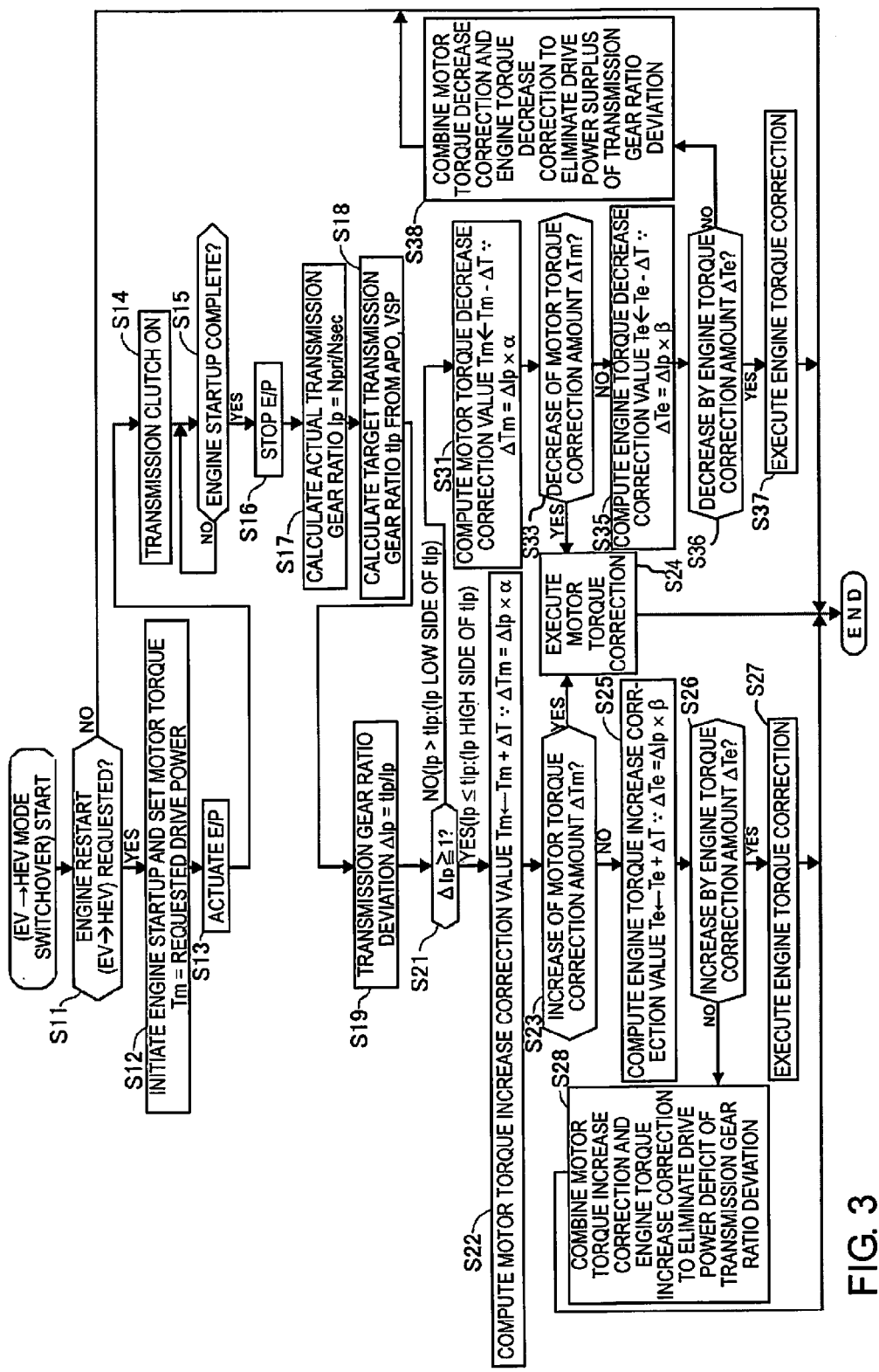
FIG. 3 is a flowchart showing an EV→HEV mode-switching control program executed by a hybrid controller in FIG. 1.

In step S11 of FIG. 3, a check is performed as to whether an engine restart request (EV→HEV mode switch request) like that at instant t2 of FIG. 4 has been generated. If a request has not been generated, the current HEV operation should be continued, and EV→HEV mode-switching as in FIG. 3 is unnecessary, and therefore control is terminated, while making no changes. In the case of a determination in step S11 that an engine restart request (EV→HEV mode switch request) has been generated (instant t2 of FIG. 4 has been reached), it is necessary to perform mode-switching from the current HEV operation to EV operation, and therefore control advances to step S12.

In step S12, of the procedures of startup of the engine 1 and engaging of the transmission clutch CL, which it is necessary to carry out during EV→HEV mode-switching, the former, i.e., engine startup, is initiated by the starter 3, which, as will be clear from the engine rotation speed Ne between instant 2 and 3, cranks the engine 1, as well as controlling the electric motor 2 such that the motor torque Tm thereof is brought to a target drive power-corresponding value dependent on the running state.

In the next step S13, the electric pump E/P is actuated, and working oil is discharged therefrom. In the next step S14, in order to engage the transmission clutch CL using working oil from the electric pump E/P as the medium, engagement pressure Pc for this purpose is generated as shown starting at instant t2 in FIG. 4, and engaging of the transmission clutch CL, which is required during EV→HEV mode-switching, is carried out.

In step S15, a check is performed as to whether the engine startup procedure initiated in step S12 has completed, that is, whether instant t3 in FIG. 4, at which the engine 1 has attained complete explosion and initiated self-sustaining running, has been reached; and until engine startup has completed, returns control to that immediately prior, and waits for the engine 1 to initiate self-sustaining running (reach instant t3 in FIG. 4). When in step S15 it is determined that engine startup has completed (instant t3 in FIG. 4), the oil pump O/P discharges working oil, making the working oil from the electric pump E/P unnecessary, and therefore in step S16 the electric pump E/P is stopped.

For the aforedescribed reasons, during the interval from instant t1-t3 in FIG. 4, the actual transmission gear ratio (pulley ratio) Ip of the continuously variable transmission 4 (the continuously variable transmission mechanism CVT) cannot be calculated and is unclear; but starting at instant t3, engine rotation is input to the continuously variable transmission 4 (the continuously variable transmission mechanism CVT) due to a rise in the engine rotation speed Ne, whereby the actual transmission gear ratio Ip of the continuously variable transmission 4 (the continuously variable transmission mechanism CVT) can be calculated. Thus, in step S17 starting at instant t3, the actual transmission gear ratio (pulley ratio) Ip of the continuously variable transmission 4 (the continuously variable transmission mechanism CVT) is calculated from the computation Ip=Npri/Nsec.

In step S18, a moment-to-moment target transmission gear ratio tIp is calculated starting at instant t3, from the running state (the accelerator opening amount APO and the vehicle speed VSP) at each instant. In step S19, a transmission gear ratio deviation $\Delta Ip$ (=tIp/Ip) representing the ratio of the target transmission gear ratio tIp to the actual transmission gear ratio Ip is computed. In step S21, depending on whether the transmission gear ratio deviation $\Delta Ip$ is 1 or greater, a check is performed as to whether Ip≤tIp (the actual transmission gear ratio Ip is to the high side of the target transmission gear ratio tIp), or Ip>tIp (the actual transmission gear ratio Ip is to the low side of the target transmission gear ratio tIp).

When, in step S21, it is determined that the transmission gear ratio deviation $\Delta Ip$ is 1 or greater, that is, a case in which, as shown in FIG. 4, Ip≤tIp (the actual transmission gear ratio Ip is to the high side of the target transmission gear ratio tIp), resulting in a deficit of the vehicle wheel drive power with respect to the requested drive power, the deficit being equivalent to the transmission gear ratio deviation between the actual transmission gear ratio Ip and the target transmission gear ratio tIp, in step S22, a motor torque increase correction amount ΔTm necessary to eliminate this drive power deficit is calculated by multiplication of the transmission gear ratio deviation ΔIp by a constant α, and this motor torque increase correction amount ΔTm is added to the pre-correction motor torque Tm shown by a dot-and-dash line in FIG. 4, to obtain a motor torque increase correction value (Tm+ΔTm) as shown by a solid line in FIG. 4.

In step S23, a check is performed as to whether there is latitude on the electric motor 2 side sufficient to top up the torque by the equivalent of the motor torque increase correction amount ΔTm. If latitude exists, in step S24, output control of the electric motor 2 is carried out to bring the output torque to the motor torque increase correction value (Tm+ΔTm), eliminating the drive power deficit caused by the transmission gear ratio deviation between the actual transmission gear ratio Ip and the target transmission gear ratio tIp.

When, in step S23, it is determined that there is no latitude on the electric motor 2 side sufficient to top up the torque by the equivalent of by the motor torque increase correction amount ΔTm, in step S25, an engine torque increase correction amount ΔTe necessary to eliminate the drive power deficit caused by the transmission gear ratio deviation between the actual transmission gear ratio Ip and the target transmission gear ratio tIp is calculated by multiplication of the transmission gear ratio deviation ΔIp by a constant β, and this engine torque increase correction amount ΔTe is added to the pre-correction engine torque Te shown by a dot-and-dash line in FIG. 4, to obtain an engine torque increase correction value (Te+ΔTe) as shown by a solid line in FIG. 4.

In step S26, a check is performed as to whether there is latitude on the engine 1 side sufficient to top up the torque by the equivalent of the engine torque increase correction amount ΔTe. If latitude exists, in step S27, output control of the engine 1 is carried out to bring the output torque to the engine torque increase correction value (Te+ΔTe), eliminating the drive power deficit caused by the transmission gear ratio deviation between the actual transmission gear ratio Ip and the target transmission gear ratio tIp.

When, in step S26, it is determined that there is no latitude on the engine 1 side sufficient to top up the torque by the equivalent of the engine torque increase correction amount ΔTe, in step S28, the drive power deficit caused by the transmission gear ratio deviation between the actual transmission gear ratio Ip and the target transmission gear ratio tIp is eliminated by combining motor torque increase correction comparable to that afforded by step S22 and step S24, and engine torque increase correction sufficient to compensate for the deficit encountered with motor torque increase alone.

When, in step S21, it is determined that the transmission gear ratio deviation ΔIp is less than 1, that is, in the reverse of the case shown in FIG. 4, Ip>tIp (the actual transmission gear ratio Ip is to the low side of the target transmission gear ratio tIp), resulting in a surplus of the vehicle wheel drive power with respect to the requested drive power, the surplus being equivalent to the transmission gear ratio deviation between the actual transmission gear ratio Ip and the target transmission gear ratio tIp, in step S32, a motor torque decrease correction amount ΔTm necessary to eliminate this drive power surplus is calculated by multiplication of the transmission gear ratio deviation ΔIp by a constant α, and the pre-correction motor torque Tm shown by a dot-and-dash line in FIG. 4 is decreased by the equivalent of this motor torque decrease correction amount ΔTm, to obtain a motor torque decrease correction value (Tm−ΔTm) as shown by a solid line in FIG. 4.

In step S33, a check is performed as to whether there is latitude on the electric motor 2 side sufficient to decrease the torque by the motor torque decrease correction amount ΔTm. If latitude exists, in step S24, output control of the electric motor 2 is carried out to bring the output torque to the motor torque decrease correction value (Tm−ΔTm), eliminating the drive power surplus caused by the transmission gear ratio deviation between the actual transmission gear ratio Ip and the target transmission gear ratio tIp.

When, in step S33, it is determined that there is no latitude on the electric motor 2 side sufficient to decrease the torque by the equivalent of the motor torque decrease correction amount ΔTm, in step S35, an engine torque decrease correction amount ΔTe necessary to eliminate the drive power surplus caused by the transmission gear ratio deviation between the actual transmission gear ratio Ip and the target transmission gear ratio tIp is calculated by multiplication of the transmission gear ratio deviation ΔIp by a constant β, and the pre-correction engine torque Te shown by a dot-and-dash line in FIG. 4 is decreased by the equivalent of this engine torque decrease correction amount ΔTe, to obtain an engine torque decrease correction value (Te−ΔTe).

In step S36, a check is performed as to whether there is latitude on the engine 1 side sufficient to decrease the torque by the equivalent of the engine torque decrease correction amount ΔTe. If latitude exists, in step S37, output control of the engine 1 is carried out to bring the output torque to the engine torque decrease correction value (Te−ΔTe), eliminating the drive power surplus caused by the transmission gear ratio deviation between the actual transmission gear ratio Ip and the target transmission gear ratio tIp.

When it is determined in step S36 that there is no latitude on the engine 1 side sufficient to reduce the torque by the engine torque decrease correction amount ΔTe, in step S38, the drive power surplus caused by the transmission gear ratio deviation between the actual transmission gear ratio Ip and the target transmission gear ratio tIp is eliminated by combining motor torque decrease correction comparable to that afforded by step S32 and step S24, and engine torque decrease correction sufficient to compensate for the deficit encountered with motor torque decrease alone.

Effects

According to the EV→HEV mode-switching control of the aforedescribed present embodiment, effects such as the following, described in relation to FIG. 4, are achieved. In cases of a difference between the target transmission gear ratio tIp and the actual transmission gear ratio Ip of the continuously variable transmission 4 (the continuously variable transmission mechanism CVT), which value it is possible to compute starting at instant t3 upon completion of engine startup which was initiated at instant t2 when an EV→HEV mode-switching request was generated by release of braking control input (brake switch OFF) and depressing of the accelerator (accelerator opening amount APO>0), a deficit or surplus of drive power caused by transmission gear ratio deviation between the two results in driver discomfort associated with an inability to obtain a drive power level commensurate to the driver's control input.

According to the present embodiment, however, the output of the electric motor 2 and/or the engine 1 is corrected so as to eliminate the deficit or surplus of drive power due to the transmission gear ratio deviation, whereby the deficit or surplus of drive power caused by the transmission gear ratio deviation at the time of EV→HEV mode-switching is eliminated, and a change in drive power drive power that is commensurate to the driver's control input can be produced, eliminating the discomfort associated with a drive power level that differs from the driver's control input.

Moreover, in the present embodiment, during elimination of the aforedescribed deficit or surplus of drive power, the output correction ΔTm of the electric motor 2, for which more highly accurate output control at higher response than with the engine 1 is possible, is employed preferentially (step S22, step S24, and step S32), whereby the effect of eliminating the aforedescribed discomfort can be achieved to a greater degree.

When there is not sufficient latitude on the electric motor 2 side for the output correction ΔTm to be accomplished (step S23 and step S33), the deficit or surplus of drive power caused by the transmission gear ratio deviation is eliminated using the output correction ΔTe of the engine 1 (step S25, step S27, step S35, and step S37), whereby the output correction ΔTm of the electric motor 2 and the output correction ΔTe of the engine 1, which differ in terms of response and accuracy, are not employed concomitantly, and the effect of eliminating the aforedescribed discomfort can be achieved, while avoiding difficulty of control.

When a deficit or surplus of drive power caused by transmission gear ratio deviation cannot be eliminated by either the output correction ΔTm of the electric motor 2 or the output correction ΔTe of the engine 1, respectively, in isolation, the output correction ΔTm of the electric motor 2, for which more highly accurate output control at higher response is possible, is employed preferentially, and any deficit thereof is carried out by the output correction ΔTe of the engine 1 (step S28 and step S38), and while some disadvantage in terms of accuracy is unavoidable by doing so, there is no problem in terms of inability to eliminate a deficit or surplus of drive power caused by transmission gear ratio deviation, and the effect of eliminating the aforedescribed discomfort can be reliably achieved.

Other Embodiments

In the aforedescribed embodiment, there was described a case in which the engine 1 is cranked by the starter motor 3 during engine startup. However, operation and working effect comparable to that obtained through application of the aforedescribed idea of the present invention can be obtained, by cranking the engine 1 in the following manner instead.

Specifically, some recent hybrid vehicle and idle-stop vehicles are configured such that the usual alternator (generator) installed in drive-coupled fashion to the engine crankshaft is replaced by a motor/generator that is capable of a power-running function as well, and when the engine is restarted after an idle stop, or when the engine is provided with torque assist as needed for running the engine, the objective is achieved by having the motor/generator perform this power-running function.

In the case of such hybrid vehicles, cranking of the engine 1 during engine startup may be accomplished through power-running by the motor/generator, rather than by the starter motor 3. The idea of the present invention is applicable in such vehicles as well, and operation and working effects comparable to the aforedescribed will be obtained in this case as well.

Additionally, when making a determination as to whether braking is in progress, the determination is made on the basis of whether the brake switch 26 is ON; however, the determination as to whether braking is in progress is not limited thereto, and the determination as to whether braking is in progress could be made on the basis of a physical quantity that changes according to brake control input, e.g., when the brake pedal stroke amount, or a brake fluid pressure sensor detection value, has reached a braking determination value.

The invention claimed is:

1. A hybrid vehicle mode-switching control device for a hybrid vehicle that is equipped with an electric motor in addition to an engine as power sources, the engine is drive-coupled to vehicle wheels via a transmission, and the transmission and the vehicle wheels can be decoupled by a clutch; the hybrid vehicle mode-switching control device comprising:

at least one controller programmed to select an electric operation mode in which operation is powered by the electric motor only by releasing the clutch and stopping the engine and to select a hybrid operation mode in which operation is powered by the electric motor and the engine by starting the engine and engaging the clutch, the at least one controller being further programmed to control an output of at least one of the electric motor and the engine to a value dependent on a vehicle running state while mode switching from the electric operation mode to the hybrid operation mode, and upon determining an actual transmission gear ratio of the transmission differs from a target transmission gear ratio corresponding to the vehicle running state, the at least one controller being further programmed to correct the output of the at least one of the electric motor and the engine to reduce a surplus or deficit of drive power caused by a transmission gear ratio deviation between the actual transmission gear ratio and the target transmission gear ratio.

2. The hybrid vehicle mode-switching control device as claimed in claim 1, wherein during the mode-switching, the at least one controller is further programmed to control the output of the electric motor until startup of the engine is completed so as to obtain a requested drive power corresponding to the vehicle running state; and after startup of the engine is completed, the at least one controller is further programmed to correct the output of the at least one of the electric motor and the engine to reduce a surplus or deficit of the drive power caused by the transmission gear ratio deviation.

3. The hybrid vehicle mode-switching control device as claimed in claim 2, wherein the at least one controller is further programmed to correct the surplus or deficit of the drive power caused by the transmission gear ratio deviation by using only output correction of the electric motor alone to obtain a target drive power upon determining that the surplus or deficit of the drive power can be reduced solely by controlling the output of the electric motor alone.

4. The hybrid vehicle mode-switching control device as claimed in claim 3, wherein the at least one controller is further programmed to correct the surplus or deficit of the drive power caused by the transmission gear ratio deviation by using output correction of the engine upon determining that the surplus or deficit of the drive power cannot be reduced through output correction of the electric motor alone to obtain a target drive power.

5. The hybrid vehicle mode-switching control device as claimed in claim 4, wherein
the at least one controller is further programmed to correct the surplus or deficit of the drive power caused by the transmission gear ratio deviation by using output correction of both the electric motor and the engine upon determining that the surplus or deficit of the drive power cannot be reduced output correction of only one of the electric motor and the engine alone to obtain a target drive power.

6. The hybrid vehicle mode-switching control device as claimed in claim 2, wherein
the at least one controller is further programmed to correct the surplus or deficit of the drive power caused by the transmission gear ratio deviation by using output correction of the engine upon determining that the surplus or deficit of the drive power cannot be reduced through output correction of the electric motor alone to obtain a target drive power.

7. The hybrid vehicle mode-switching control device as claimed in claim 6, wherein
the at least one controller is further programmed to correct the surplus or deficit of the drive power caused by the transmission gear ratio deviation by using output correction of both the electric motor and the engine upon determining that the surplus or deficit of the drive power cannot be reduced output correction of only one of the electric motor and the engine alone to obtain a target drive power.

8. The hybrid vehicle mode-switching control device as claimed in claim 1, wherein
the at least one controller is further programmed to correct the surplus or deficit of the drive power caused by the transmission gear ratio deviation by using only output correction of the electric motor alone to obtain a target drive power upon determining that the surplus or deficit of the drive power can be reduced solely by controlling the output of the electric motor alone.

9. The hybrid vehicle mode-switching control device as claimed in claim 1, wherein
the at least one controller is further programmed to correct the surplus or deficit of the drive power caused by the transmission gear ratio deviation by using output correction of the engine upon determining that the surplus or deficit of the drive power cannot be reduced through output correction of the electric motor alone to obtain a target drive power.

10. The hybrid vehicle mode-switching control device as claimed in claim 9, wherein
the at least one controller is further programmed to correct the surplus or deficit of the drive power caused by the transmission gear ratio deviation by using output correction of both the electric motor and the engine upon determining that the surplus or deficit of the drive power cannot be reduced output correction of only one of the electric motor and the engine alone to obtain a target drive power.

* * * * *